US008184677B1

(12) United States Patent
McRobert et al.

(10) Patent No.: US 8,184,677 B1
(45) Date of Patent: May 22, 2012

(54) ARRANGEMENT IN A NETWORK REPEATER FOR MONITORING LINK INTEGRITY AND AUTOMATICALLY DOWN SHIFTING LINK SPEED

(75) Inventors: Stephen McRobert, Sunnyvale, CA (US); Rudolph Sterner, Los Altos, CA (US)

(73) Assignee: GLOBALFOUNDRIES Inc., Grand Cayman (KY)

( * ) Notice: Subject to any disclaimer, the term of this patent is extended or adjusted under 35 U.S.C. 154(b) by 1826 days.

(21) Appl. No.: 09/256,786

(22) Filed: Feb. 24, 1999

Related U.S. Application Data

(60) Provisional application No. 60/076,360, filed on Feb. 27, 1998.

(51) Int. Cl.
*H04B 17/02* (2006.01)
*H04B 3/46* (2006.01)
*H04L 23/00* (2006.01)
*H04L 1/20* (2006.01)

(52) U.S. Cl. ......... 375/213; 375/224; 375/377; 370/247

(58) Field of Classification Search ................... 375/211, 375/213, 219, 220, 224, 225, 295, 316, 377, 375/222; 370/241, 242, 246, 247; 379/1.01, 379/4; 455/7, 14

See application file for complete search history.

(56) References Cited

U.S. PATENT DOCUMENTS

| | | | | |
|---|---|---|---|---|
| 4,451,916 A | * | 5/1984 | Casper et al. ................. | 359/110 |
| 4,653,070 A | * | 3/1987 | Nakajima et al. ............. | 714/800 |
| 4,710,925 A | | 12/1987 | Negi | |
| 5,038,364 A | * | 8/1991 | Motoori ........................ | 375/213 |
| 5,309,428 A | * | 5/1994 | Copley et al. ................. | 370/245 |
| 5,363,366 A | * | 11/1994 | Wisdom et al. ............... | 370/245 |
| 5,365,513 A | * | 11/1994 | Copley et al. ................. | 370/253 |
| 5,381,348 A | * | 1/1995 | Ernst et al. .................... | 324/533 |
| 5,425,017 A | * | 6/1995 | Copley et al. ................. | 370/245 |
| 5,444,695 A | * | 8/1995 | Copley et al. ................. | 370/452 |
| 5,491,687 A | | 2/1996 | Christensen et al. | |
| 5,541,957 A | | 7/1996 | Lau | |
| 5,557,633 A | * | 9/1996 | Staab et al. ................... | 375/213 |
| 5,887,050 A | * | 3/1999 | Fenske et al. .................... | 379/4 |
| 6,067,585 A | * | 5/2000 | Hoang .......................... | 370/401 |
| 6,160,436 A | * | 12/2000 | Runaldue ..................... | 327/403 |

FOREIGN PATENT DOCUMENTS

| | | |
|---|---|---|
| EP | 0 334 510 | 9/1989 |
| WO | WO 97/29573 | 8/1997 |

* cited by examiner

*Primary Examiner* — Tesfaldet Bocure
(74) *Attorney, Agent, or Firm* — Ditthavong Mori & Steiner, P.C.

(57) ABSTRACT

A network repeater having a plurality of repeater ports selectively establishes links with remote nodes at one of two data rates based on the capabilities of the remote network node and a determined link integrity. A network repeater establishes a link with a network node using auto-negotiation techniques to establish a 100 Mb/s link. The network repeater then monitors the link for symbol errors, and determines an integrity of the link based on a detected number of symbol errors relative to a prescribed threshold. If the detected number of symbol errors reaches the prescribed threshold, indicating poor link integrity due to poor cable connection or condition, faulty network device, etc., the network repeater performs a down shifting operation by breaking the established 100 Mb/s link, and restarting auto-negotiation to establish a 10 Mb/s link. Hence, the network repeater may monitor high-speed links for link integrity, and selectively downshift a link encountering a substantial number of errors to a reduced data rate, without a necessity of a network manager or other remote management function.

12 Claims, 2 Drawing Sheets

ARRANGEMENT IN A NETWORK REPEATER FOR MONITORING LINK INTEGRITY AND AUTOMATICALLY DOWN SHIFTING LINK SPEED

CROSS REFERENCE TO RELATED APPLICATIONS

This application claims priority from copending Provisional Application No. 60/076,360, filed Feb. 27, 1998.

BACKGROUND OF THE INVENTION

1. Field of the Invention

The present invention relates to network repeaters, more specifically to units incorporating two or more IEEE 802.3 compliant repeaters each operating at different data rates. The principle of monitoring link integrity and adjusting operating speed to minimize error rate may also be applied to other networking equipment, including (but not limited to): Bridges, Routers, Network interfaces and switches.

2. Background Art

Network repeaters are typically used to connect between network nodes, for example network stations serving as data terminal equipment (DTE) on different network media. Repeaters provide the advantage of extending the physical distance between network nodes by receiving a data packet from one network medium, reconditioning the physical signal, and outputting the data packet to a second network medium. The repeater may also forward carrier sense and collision signals, effectively extending the collision domain of one medium onto the second medium.

Repeaters interconnecting network nodes on different network media have conventionally been configured to connect only networks operating at the same transmission rate. One problem encountered in higher-speed networks, for example 100 Mb/s IEEE 802.3 networks, is the identification of a link, between the network repeater and a remote network node on one of the network repeater ports, having a poor level of integrity. In particular, there is a need to discover links between a repeater port and a network node that are not performing up to specifications, for example due to a poor cable connection or condition, a faulty network interface device at the remote node, etc.

One proposal for handling link failure is by using network management capabilities, for example, a remote management function (i.e., network manager) configured for monitoring and controlling operations of the repeater and the network nodes. For example, a remote management technique may use a management protocol to transmit management information between the repeater and the network manager. However, such an arrangement necessarily relies on a management function, and hence is inapplicable in unmanaged network. Moreover, the monitoring of links by a centralized network manager requires that each unit to be managed incorporate a function to handle the management protocol (an agent) increasing the complexity and processing requirements of the managed unit, e.g. a repeater.

SUMMARY OF THE INVENTION

There is a need for an arrangement for interconnection of different speed network nodes using a repeaters, where the link integrity between a repeater and the network nodes can be reliably monitored without the necessity of a network manager.

There is also a need for an arrangement in a network having a repeater for monitoring the link status of high speed data links, and automatically changing a selected high speed data link to a slower data rate based on detection of a marginal or unacceptable link status on the selected high speed data link.

These and other needs are attained by the present invention, where a network repeater monitors each repeater port link in communication with a remote network node at a corresponding data rate. The network repeater monitors each link by counting a detected number of symbol errors, and determining the integrity of the link based on the detected number of symbol errors relative to a prescribed threshold. The network repeater, upon detecting a link having a poor integrity as measured by the prescribed threshold, may selectively reconfigure the link by reducing the data rate on the network medium to provide a more reliable link having a reduced number of symbol errors.

According to one aspect of the present invention, a method in a network repeater includes establishing a link with a remote network node at a prescribed data rate via a network medium, monitoring the link by counting a detected number of symbol errors, and determining an integrity of the link based on the detected number of symbol errors relative to a prescribed threshold. Monitoring the link by counting a detected number of symbol errors enables the network repeater to determine the link integrity of each network repeater port in a relatively simple manner without the necessity of an external management function such as a network manager. Moreover, monitoring of the link by counting the detected number of symbol errors enables the network repeater to determine the integrity of the link with minimal complexity, minimizing the processing burdens normally encountered during network monitoring.

An additional feature of this aspect includes selectively reducing the data rate on the network medium to a reduced data rate in response to the number of symbol errors exceeding prescribed threshold. Hence the network repeater, upon detecting that the number of symbol errors exceeds the prescribed threshold, may reduce the data rate on the identified link in an effort to provide a more reliable link that has a reduced number of symbol errors occurring relative to the link having the higher data rate.

Another aspect of the present invention provides a network repeater having a plurality of repeater ports, configured for sending and receiving data packets between remote network nodes via respective network media. The network repeater includes a first repeater for sending and receiving data packets between a first group of the repeater ports according to a first data rate. The network repeater also includes a second repeater core configured for sending and receiving data packets between a second group of the repeater ports according to a second data rate slower than the first data rate. An autonegotiation unit is configured for selecting one of the first and second data rates for establishment of links between the repeater ports and the respective remote network nodes via the respective network media. A symbol error detector is configured for detecting a number of symbol errors relative to a prescribed time interval on at least one of the links operating at the first data rate. The repeater also includes a controller configured for selectively changing the at least one link from the first data rate to the second data rate based on the number of symbol errors reaching a prescribed threshold. The symbol error detector can detect the number of symbol errors on at least one link, enabling monitoring of each link without the necessity of an external management function. Moreover, the controller enables the link to be reduced to a lower speed in the event that a higher number of symbol errors are detected, eliminating the necessity of an external management function to monitor link integrity or execute more complex routines in an effort to overcome poor link integrity conditions.

Additional advantages and novel features of the invention will be set forth in part in the description which follows, and in part will become apparent to those skilled in the art upon examination of the following or may be learned by practice of the invention. The advantages of the invention may be realized and attained by means of the instrumentalities and combinations particularly pointed out in the appended claims.

BRIEF DESCRIPTION OF THE DRAWINGS

Reference is made to the attached drawings, wherein elements having the same reference number designations represent like elements throughout and wherein.

BEST MODE FOR CARRYING OUT THE INVENTION

Figure 1:
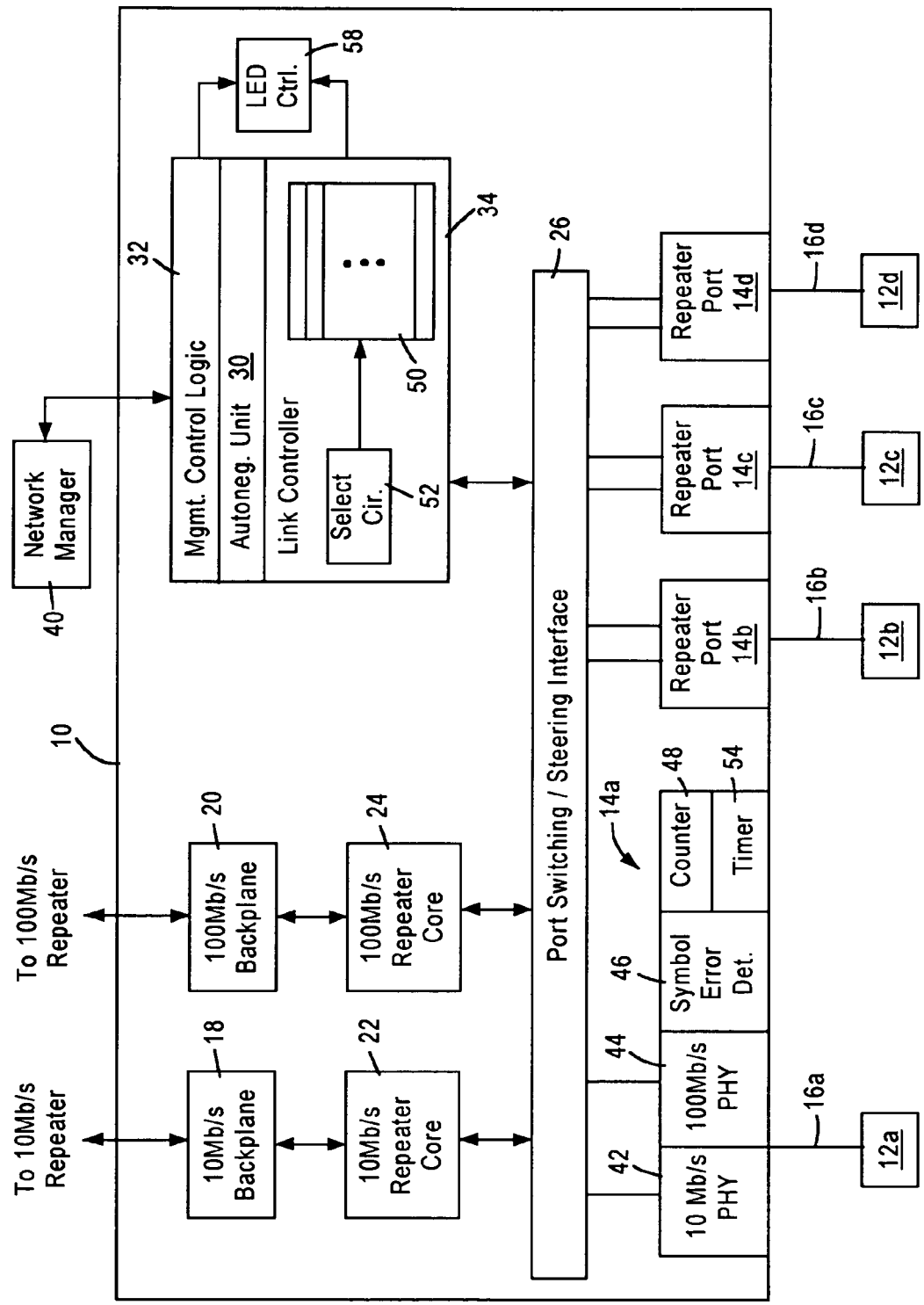
FIG. 1 is a block diagram of a network repeater according to an embodiment of the present invention.

FIG. 1 is a block diagram of a network repeater 10 configured for transmitting data packets between remote network nodes 12 according to an embodiment of the present invention. The repeater 10 is a fully integrated multiple port repeater that can operate at both 10 Mb/s and 100 Mb/s. In particular, the repeater 10 includes four repeater ports 14 that transmit and receive data packets with the respective remote network nodes 12 according to IEEE 802.3 protocol. Each repeater port 14 establishes a link with the corresponding network node 12 at a prescribed data rate (e.g., 10 Mb/s or 100 Mb/s) via a network medium 16, for example as category 3 unshielded twisted pair (UTP) or category 5 UTP cable. As described below, each repeater port 14 automatically configures to the speed of the remote network nodes 12 using auto-negotiation protocols. As recognized in the art, the 10-BASE-T protocol specifies transmitting Ethernet (IEEE 802.3) data packets at 10 Mb/s over two twisted pairs UTP wiring, where the maximum cable segment distance is 100 meters from the node 12 to the repeater 10. The 100 BASE-TX standard specifies transmission of Ethernet (IEEE 802.3) data packets at 100 Mb/s over two pairs of category 5 UTP wiring, where the maximum cable segment distance is 100 meters from the node 12 to the repeater 10.

As described below, the repeater 10 also includes a 10 Mb/s back plane 18 and a 100 Mb/s back plane 20, enabling the repeater 10 to be connected to other similar repeaters, effectively forming a large port-count repeater.

The repeater 10 also includes a 10 Mb/s repeater core 22 and a 100 Mb/s repeater core 24. The repeater cores 22 and 24 are configured for sending and receiving data packets between selected repeater ports according to the respective data rates. In particular, the repeater 10 includes a port switching and steering interface 26 configured for selectively connecting each network port 14 to one of the repeater cores 22 or 24 based on the corresponding link speed of the repeater port 14. For example, if the repeater port 14a is configured for sending and receiving data packets via medium 16a at the link speed of 10 Mb/s, the port switching and steering interface 26 connects the repeater port 14a to the repeater core 22. Similarly, if the repeater port 14b is configured for sending and receiving data packets on the medium 16b at the link speed of 100 Mb/s, the port switching and steering interface 26 connects the repeater port 14b to the 100 Mb/s repeater core 24. The port switching and steering interface 26 may be implemented as a plurality of multiplexers that selectively connect each port 14 to the appropriate repeater core 22 or 24 depending on the determined link speed for the corresponding repeater port 14.

The repeater cores 22 and 24 are implemented as state machines configured for operation compliant with IEEE 802.3 Section 9 and Section 27, respectively. In particular, the 10 Mb/s repeater state machine 22 is configured such that all repeater ports 14 operating in the 10 Mb/s collision domain, within the repeater 10 or via a 10 Mb/s expansion bus coupled to the back plane 18, form a single repeater that is compliant with IEEE 802.3 Section 9. If any single port 14 connected to the 10 Mb/s repeater state machine 22 senses the start of a valid packet, the repeater core 22 will retransmit the received packet on all the other ports connected to the core 22 unless a collision is detected. The repeater core 22 also supplies the packet to the 10 Mb/s expansion bus coupled to the backplane 18 to facilitate designs using multiple repeaters 10. When retransmiting a packet, the repeater core 22 ensures that the outgoing packets comply with IEEE 802.3 signal amplitude, symmetry, and jitter requirements based on a clock that is internal to the repeater 10. In addition, the repeater core 22 will ensure that the preamble will have a minimum of 56 bits before the start of frame delimiter (SFD).

The repeater core 22 also detects and responds to collision conditions on all ports connected to the repeater core 22 as specified in IEEE 802.3, Section 9, including collision conditions detected via the back plane 18.

Other recognized functions are performed by the repeater core 22 to ensure reliable transfer of data in the 10 Mb/s collision domain for example fragment extension and auto-partition/recognition.

The 100 Mb/s repeater core 24 is implemented as a state machine configured such that all ports operating in the 100 Mb/s collision domain in the repeater 10, or via the 100 Mb/s backplane 20, form a single repeater that is compliant to IEEE 802.3u Section 27. In particular, if any port 14 connected to the 100 Mb/s core 24 senses the start of a valid packet, the repeater core 24 will transmit the received packet on all the other connected ports unless a collision is detected. The repeated data is also supplied to the backplane 20 for transmission to other repeaters connected to the backplane 20. As described above, the 100 Mb/s repeater core 24 ensures that the outgoing packet on a transmit port complies with the IEEE 802.3u (Sections 24, 25 and 27) signal amplitude, symmetry, and jitter requirements. The transmitted signal is also retimed by an internal clock. Other recognized functions are performed by the repeater core 24 to ensure reliable transfer of data in the 100 Mb/s collision domain. The repeater 10 also includes an auto-negotiation unit 30, management control logic 32, and a link controller 34. The auto-negotiation unit 30 performs auto-negotiation as defined in IEEE 802.3 Section 28. The auto-negotiation unit 30 uses auto-negotiation protocol to establish a link between each repeater port 14 in the corresponding node 12 according to a selected data rate based upon the capabilities of the corresponding node 12. For example, if the remote node 12a is capable of transmitting at 100 Mb/s, the auto-negotiation unit 30 establishes the link between the repeater port 14a and the remote network node 12a at a 100 Mb/s data rate (100 BASE-TX). However, if the remote node 12a is not able to send and receive data packets at 100 Mb/s, the auto-negotiation unit 30 establishes the link between the repeater port 14a and remote node 12a via the network medium 16a at 10 Mb/s (10 BASE-T). In particular, the auto-negotiation unit 30 uses a burst of link pulses referred to as fast link pulses (FLPs), that are spaced between 55 microseconds and 100 140 microseconds so as to be ignored by a standard 10 BASE-T receiver. The FLP burst contains information about the capabilities of the transmitting device namely the repeater port 14. The remote network node 12 capable of 100 Mb/s transmission and reception decodes the FLP burst to learn about the capabilities of the transmitting device 14.

The repeater 10 also includes management control logic 32 that provides an interface to a processor 40 acting as a network management agent. The management control logic 32 allows the network manager 40 to perform indirect access of the control registers within the network repeater 10, configured in accordance with IEEE 802.3u Section 22.

The link controller 34 is configured for selectively changing the established links between the repeater ports 14 and the remote network nodes 12 from the 100 Mb/s data rate to the 10 Mb/s data rate based on a detected reduction in the link integrity. Specifically, the link controller 34 is configured for detecting and correcting for excessive error rate in the 100 Mb/s links, for example due to faulty cabling or equipment. The integrity of each 100 Mb/s link is determined by performing a high-speed link integrity check on each 100 Mb/s link. Specifically, each repeater port 14 includes a 10 Mb/s physical layer transceiver 42, a 100 Mb/s physical layer transceiver 44, plus a symbol error detector 46, a counter 48 and a timer 54. The symbol error detector 46 is configured for detecting a number of symbol errors on the corresponding link when the repeater port 14 uses the 100 Mb/s transceiver 44 operating at the 100 Mb/s data rate according to the symbol definitions of Table 1.

TABLE 1

Symbol Definitions

| Symbol (HEX) | NRZ | 4b/5b | Interpretation |
| --- | --- | --- | --- |
| 0 | 0000 | 11110 | Data 0 |
| 1 | 0001 | 01001 | Data 1 |
| 2 | 0010 | 10100 | Data 2 |
| 3 | 0011 | 10101 | Data 3 |
| 4 | 0100 | 01010 | Data 4 |
| 5 | 0101 | 01011 | Data 5 |
| 6 | 0110 | 01110 | Data 6 |
| 7 | 0111 | 01111 | Data 7 |
| 8 | 1000 | 10010 | Data 8 |
| 9 | 1001 | 10011 | Data 9 |
| A | 1010 | 10110 | Data A |
| B | 1011 | 10111 | Data B |
| C | 1100 | 11010 | Data C |
| D | 1101 | 11011 | Data D |
| E | 1110 | 11100 | Data E |
| F | 1111 | 11101 | Data F |
| Idle | Undefined | 11111 | Idle Symbol |
| J | 0101 | 11000 | Start of Stream Delimiter: 1 of 2 |
| K | 0101 | 10001 | Start of Stream Delimiter: 2 of 2 |
| T | Undefined | 01101 | End of Stream Delimiter: 1 of 2 |
| R | Undefined | 00111 | End of Stream Delimiter: 2 of 2 |
| H | Undefined | 00100 | Error Bit. |

The counter 48 may be configured for incrementing or decrementing (depending on the embodiment) a counter value in response to each of the detected symbol errors from the PHY 44. As described below, the link controller monitors the link by counting the detected number of symbol errors for each port 14, and determines the integrity of the link based on the detected number of symbol errors relative to a prescribed threshold. If the detected number of symbol errors reaches the prescribed threshold relative to a prescribed time interval, the link controller 34 selectively reduces the data rate on the corresponding network medium 16 to the reduced 10 Mb/s data rate by breaking the link, and performing auto-negotiation by advertising that the corresponding repeater port 14 is only capable of 10 Mb/s operation. Hence, a second link is established at the 10 Mb/s data rate, reducing the probabilities of symbol errors.

As shown in FIG. 1, the link controller 34 includes a table 50 and a selector circuit 52. The table 50 stores a plurality of available thresholds, and the selector circuit 52 selects one of the available thresholds as the prescribed threshold corresponding to an unacceptable symbol error rate based on a selection signal from the management control logic 32 or by some other means allowing a threshold to be selected in a system without management. Hence, the repeater 10 may be initially programmed with a plurality of thresholds stored in table 50, and a configuration register may also be programmed for selecting one of the thresholds, as well as the selected enabling of the downshift operation on a per-port basis.

Figure 2:
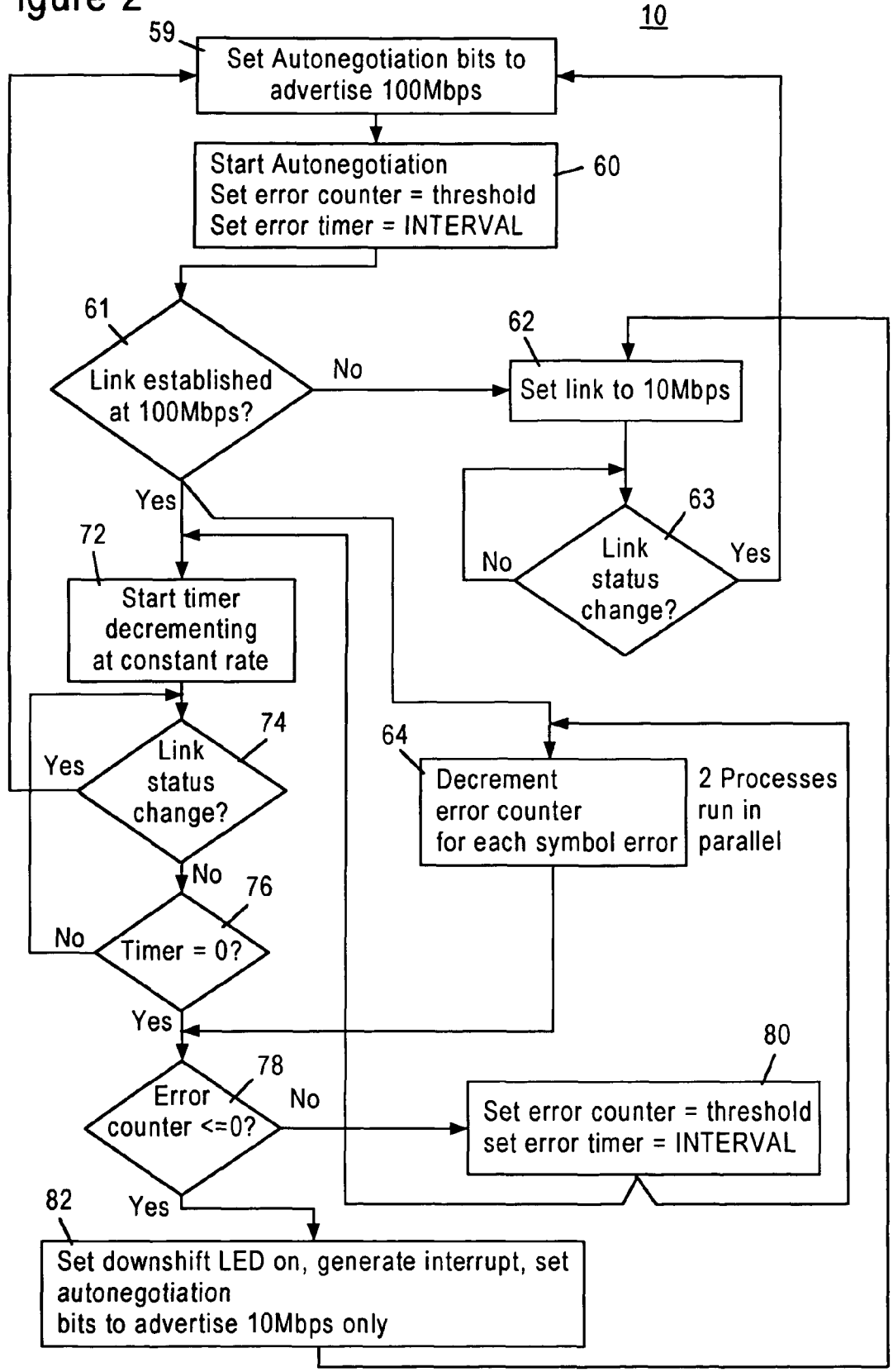
FIG. 2 is a flow diagram illustrating the method in the network repeater of controlling transmissions according to an embodiment of the present invention.

FIG. 2 is a diagram illustrating a method for controlling transmission by monitoring link integrity and selectively reducing the data transmission rate on a repeater port 14 having a link with a detected number of symbol errors reaching a prescribed threshold. FIG. 2 only illustrates the process for one port. In any multiport repeater such as the one shown in FIG. 1 each port will have its own set of processes, and all processes will run simultaneously.

The process for one port starts at step 59, when certain register bits are set to advertise that this port (e.g., 14a) is capable of 100 Mbps operation.

In step 60 the error counter 48 is preset to a threshold value determined by the select circuit 52. The timer 54 is set to a value which will result in the desired sampling interval. Auto-Negotiation is then started following the rules of IEEE 802.3u.

In step 61 it is determined whether a successful link has been established at 100 Mbps. If yes, processes 72 and 64 are both started simultaneously. If no, the link is set to 10 Mbps in step 62 and the port will attempt to establish a link at that speed. If it is immediately successful in establishing link at 10 Mbps it proceeds to step 63, in which it continuously monitors the link for any changing status. If no link is detected, it also proceeds to step 63 in which it monitors for any sign of link being established. In either case any change of status (from good link at 10 Mbps to no link, or from no link to link established) will cause a return to step 59.

Steps 64, 72, 74 and 76 are attempts to illustrate the different aspects of one process. The interval timer 54 counts down at a constant rate, until it reaches 0. At the same time, the error monitor 46 continuously monitors the input symbol stream, and decrements counter 48 once for each symbol error detected. Coincident with these processes the link status is tested as shown with step 74, following the same rules as step 63.

When the timer 54 reaches 0 (step 76) the value of the error counter 48 is tested as shown in step 78. If the value of the counter is greater than zero, the system (e.g., link controller 34) considers that the error rate has been acceptable. It proceeds to step 80, where the counter and timer are reset and the monitoring cycle is re-started by returning to steps 72 and 64.

If the value of the error counter has fallen to 0 this shows that an unacceptable number of errors have occurred during the sampling interval. The system proceeds to step 82, when the register bits referred to in step 59 are reset to advertise that this port is only capable of 10 Mbps operation.

The system then moves to step 62, and attempts to operate in 10 Mbps mode.

According to the disclosed embodiment, 100 Mb/s data links can be easily monitored to determine whether link integrity is not performing to required specifications, for example, due to bad cable or poorly-performing hardware circuitry, etc. The disclosed arrangement eliminates the requirements for a remote network manager 40 to continually monitor the link status for each of the network ports. Moreover, the link controller, upon detecting the symbol error rate reaching a prescribed threshold, effectively downshifts the corresponding repeater port by breaking the link and establishing a new link at the reduced data rate.

Although the disclosed arrangement describes a single link controller 34 serving each of the repeater ports 14, and link controller 34 may alternately be implemented in each of the repeater ports 14, such that each repeater port 14 is capable of independently monitoring and controlling its own link based on detected symbol error rates. Alternatively, the symbol error detectors, counters, and timers may be centrally located with the link controller 34 to provide a more centralized architecture.

While this invention has been described in connection with what is presently considered to be the most practical and preferred embodiments, it is to be understood that the invention is not limited to the disclosed embodiments, but, on the contrary, is intended to cover various modifications and equivalent arrangements included within the spirit and scope of the appended claims.

What is claimed is:

1. A method in a network repeater of controlling transmissions, the method comprising:
   establishing a link with a remote network node at a prescribed data rate via a network medium;
   monitoring the link by counting a detected number of symbol errors and decrementing a counter in response to detecting one of the symbol errors; and
   determining an integrity of the link based on the detected number of symbol errors relative to a prescribed threshold.

2. The method of claim 1, wherein the decrementing step includes halting the decrementing of the counter if the counter has a value of zero.

3. The method of claim 1, wherein the determining step includes determining the integrity relative to a prescribed time interval equal to about one millisecond, the time interval being controlled by a timer counting down to zero.

4. A method in a network repeater of controlling transmissions, the method comprising:
   establishing a link with a remote network node at a prescribed data rate via a network medium;
   monitoring the link by counting a detected number of symbol errors;
   determining an integrity of the link based on the detected number of symbol errors relative to a prescribed threshold; and
   selecting the prescribed threshold from a plurality of thresholds.

5. A method in a network repeater of controlling transmissions, the method comprising:
   establishing a link with a remote network node at a prescribed data rate via a network medium;
   monitoring the link by counting a detected number of symbol errors;
   determining an integrity of the link based on the detected number of symbol errors relative to a prescribed threshold; and
   supplying the prescribed threshold to the network repeater via a serial interface.

6. A method in a network repeater of controlling transmissions, the method comprising:
   establishing a link with a remote network node at a prescribed data rate via a network medium;
   monitoring the link by counting a detected number of symbol errors;
   determining an integrity of the link based on the detected number of symbol errors relative to a prescribed threshold; and
   selectively reducing the data rate on the network medium to a reduced data rate in response to the detected number of symbol errors exceeding the prescribed threshold.

7. The method of claim 6, wherein the monitoring step includes decrementing an error counter in response to detection of each of said symbol errors, the method further comprising resetting the error counter to the threshold in response to the timer reaching zero, after resetting the value of the counter.

8. The method of claim 6, wherein the selectively reducing step includes reducing the data rate in response to the detected number of symbol errors exceeding the prescribed threshold and based on an enable signal.

9. A method in a network repeater of controlling transmissions, the method comprising:
   establishing a link with a remote network node at a prescribed data rate via a network medium;
   monitoring the link by counting a detected number of symbol errors; and
   determining an integrity of the link based on the detected number of symbol errors relative to a prescribed threshold,
   wherein the determining step includes:
      decrementing a timer from a prescribed time interval;
      decrementing a first counter initially set at a first threshold in response to a detected symbol error; and
      determining, in response to the timer reaching zero, whether the first counter has a zero value, the integrity determined based on the first counter having the zero value coincident with the timer reaching zero.

10. A network repeater having a plurality of repeater ports, configured for sending and receiving data packets between remote network nodes via respective network media, the network repeater comprising:
   a first repeater core configured for sending and receiving data packets between a first group of the repeater ports according to a first data rate;
   a second repeater core configured for sending and receiving data packets between a second group of the repeater ports according to a second data rate slower than the first data rate;
   to negotiation unit respective network media;
   a symbol error detector for detecting a number of symbol errors relative to a prescribed time interval on at least one of the links operating at the first data rate; and
   a controller for selectively changing the at least one link from the first data rate to the second data rate based on the number of symbol errors reaching a prescribed threshold.

11. The repeater of claim 10, wherein the symbol error detector includes a counter configured for decrementing a counter value in response to each of the detected symbol errors.

12. The repeater of claim 11, further comprising an optional interface to a network management agent for receiving the prescribed threshold from a network manager, the controller outputting a notification signal to the network manager in response to the number of symbol errors reaching the prescribed threshold.

* * * * *